(12) United States Patent
Silberman et al.

(10) Patent No.: US 9,114,322 B2
(45) Date of Patent: Aug. 25, 2015

(54) BEARING SYSTEM FOR OBSERVATION WHEELS

(71) Applicants: Cyril Silberman, Miami Beach, FL (US); Haskel Mayer, Miami Beach, FL (US)

(72) Inventors: Cyril Silberman, Miami Beach, FL (US); Haskel Mayer, Miami Beach, FL (US)

( * ) Notice: Subject to any disclaimer, the term of this patent is extended or adjusted under 35 U.S.C. 154(b) by 0 days.

(21) Appl. No.: 14/191,071

(22) Filed: Feb. 26, 2014

(65) Prior Publication Data

US 2015/0005082 A1    Jan. 1, 2015

Related U.S. Application Data

(60) Provisional application No. 61/769,359, filed on Feb. 26, 2013.

(51) Int. Cl.
*A63G 27/00* (2006.01)
*B61B 7/00* (2006.01)

(52) U.S. Cl.
CPC ........... *A63G 27/00* (2013.01); *Y10T 29/49696* (2015.01)

(58) Field of Classification Search
CPC ........... A63G 27/00; A63G 27/02; B61B 7/00
USPC ................................ 472/3, 29, 30, 32, 44, 45
See application file for complete search history.

(56) References Cited

U.S. PATENT DOCUMENTS

| | | | | |
|---|---|---|---|---|
| 1,050,567 | A * | 1/1913 | Saunders | 472/45 |
| 3,226,113 | A * | 12/1965 | Mercer et al. | 472/3 |
| 4,920,275 | A * | 4/1990 | Itoh | 250/574 |
| 4,988,089 | A * | 1/1991 | Knijpstra | 472/3 |
| 8,216,077 | B2 * | 7/2012 | Bussink et al. | 472/30 |
| 8,641,541 | B2 * | 2/2014 | Kitchen | 472/44 |

\* cited by examiner

*Primary Examiner* — Kien Nguyen
(74) *Attorney, Agent, or Firm* — Norton Rose Fulbright US LLP (57) ABSTRACT

Systems and related methods related to structures with large-scale rotatable elements. Some of the present systems comprise: a tower; a tower hub coupled to the tower and having a transverse dimension of at least 50 feet; an observation wheel rotatably coupled to the tower and having a central wheel hub; a plurality of roller bearings disposed between the tower hub and the wheel hub to rotatably support the observation wheel relative to the structure, the roller bearings each having a diameter that is less than one quarter of the transverse dimension of the wheel hub.

20 Claims, 8 Drawing Sheets

BEARING SYSTEM FOR OBSERVATION WHEELS

CROSS-REFERENCE TO RELATED APPLICATION

This application claims the benefit of U.S. Provisional Patent Application No. 61/769,359 filed Feb. 26, 2013, which is incorporated by reference in its entirety.

FIELD OF INVENTION

The present invention is generally related to large structures such as observation wheels and more particularly, but not by way of limitation, to a rolling-element bearing system and/or other features and improvements for large structures such as observation wheels.

BACKGROUND

Observation wheels such as the London Eye and subsequent wheels, such as the Singapore Flyer and the Star of Nanchang, contain two giant rolling element bearings in the center hub of the wheel. These giant bearings require a giant seal to encompass the bearing in order to hold in lubricant. When utilizing giant bearings in an observation wheel, the fact that components can only be produced to a certain size becomes a constraint on the overall size of the attraction. The engineering considerations that are present in the design of such large systems are materially different than those that exist with respect to smaller systems.

SUMMARY

At least some of the present embodiments provide and/or include an improved bearing system for a large system such as an observation wheel that reduces and/or eliminates the size constraints that are generally associated with larger conventional bearings.

Some embodiments of the present systems comprise: a tower; a tower hub coupled to the tower and having a transverse dimension of at least 50 feet; an observation wheel rotatably coupled to the tower and having a central wheel hub; a plurality of roller bearings disposed between the tower hub and the wheel hub to rotatably support the observation wheel relative to the structure, the roller bearings each having a diameter that is less than one quarter of the transverse dimension of the wheel hub. In some embodiments, the tower includes a base and a height of at least 200 feet above a ground level at the base, and the observation wheel having a transverse dimension of at least 400 feet. In some embodiments, the tower is a first tower, and the system further comprises: a second tower spaced apart from the first tower and coupled to the tower hub; where the tower hub extends between the first and second towers. Some embodiments further comprise: a plurality of bearing mounts each coupled to a different one of the roller bearings. In some embodiments, the plurality of bearing mounts each has a first end coupled in fixed relation to the tower hub and a second end rotatably coupled to the respective roller bearing. In some embodiments, the wheel hub has a first diameter, the tower hub has a second diameter that is smaller than the first diameter, and the wheel hub is configured to rotate around the tower hub. In some embodiments, each of the plurality of roller bearings has a diameter of between 0.5 and 5 feet. In some embodiments, the diameter of the tower hub differs from the diameter of the wheel hub by 4 feet or more. In some embodiments, the diameter of the tower hub is greater than 70 feet. In some embodiments, each of the plurality of roller bearings is independently sealed.

Some embodiments of the present methods comprise: disposing a plurality of bearings between a tower hub and an observation wheel rotatably coupled to the tower, the tower hub coupled to a tower and having a transverse dimension of at least 50 feet, and the observation wheel having a central wheel hub; where the roller bearings are disposed between the tower hub and the wheel hub to rotatably support the observation wheel relative to the structure, the roller bearings each having a diameter that is less than one quarter of the transverse dimension of the wheel hub. In some embodiments, the tower includes a base and a height of at least 200 feet above a ground level at the base, and the observation wheel having a transverse dimension of at least 400 feet. In some embodiments, the tower is a first tower, a second tower is spaced apart from the first tower and coupled to the tower hub, and the tower hub extends between the first and second towers. In some embodiments, a plurality of bearing mounts are each coupled to a different one of the roller bearings. In some embodiments, the plurality of bearing mounts each has a first end and a second end rotatably coupled to the respective roller bearing, and disposing the roller bearings comprises coupling the first end of each roller bearing in fixed relation to the tower hub. In some embodiments, the wheel hub has a first diameter, the tower hub has a second diameter that is smaller than the first diameter, and the wheel hub is configured to rotate around the tower hub. In some embodiments, each of the plurality of bearing elements has a diameter of between 0.5 and 5 feet. In some embodiments, the diameter of the tower hub differs from the diameter of the wheel hub by 4 feet or more. In some embodiments, the diameter of the tower hub is greater than 70 feet. In some embodiments, each of the plurality of roller bearings is independently sealed.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted) for at least the embodiments shown.

DETAILED DESCRIPTION OF ILLUSTRATIVE EMBODIMENTS

Referring now to the drawings, and more particular to FIGS. 1-4, shown there and designated by the reference numeral 10 is one example of the present systems. In the embodiment shown, system 10 is an observation wheel system. In the embodiment shown, system 10 comprises a first tower 14a and a second tower 14b, a tower hub 18 coupled to and extending between first and second towers 14a and 14b. Tower hub 18 can, in some embodiments, have a transverse dimension of at least 50 feet (e.g., greater than 70 feet). For example, in the embodiment shown, tower hub 18 has a diameter of 80 feet. In the embodiment shown, system 10 also comprises an observation wheel 22 rotatably coupled to the towers and having a central wheel hub 26. In the embodiment shown, observation wheel 22 comprises an outer ring 30 coupled to wheel hub 26 by a plurality of struts or spokes (and/or cables) 34, and a plurality of gondolas 38 coupled to ring 30. In the embodiment shown, ring 30 comprises dual ring members spaced apart and coupled together by a plurality of lateral members. Similarly, in the embodiment shown, wheel hub 26 comprises dual circular rail members (e.g., each having an I-shaped cross-sectional shape) that are spaced apart as illustrated. In the some embodiments, each of towers 14a and 14b has a base 42a and 42b, respectively, and a height of at least 200 feet above a ground level at each base, and observation wheel 22 has a transverse dimension of at least 400 feet (e.g., a diameter of 500 feet). In other embodiments, one of towers 14a and 14b may be omitted such that tower hub 18 is cantilevered from a single hub. Towers 14a and 14b and/or tower hub 18 can, for example, comprise concrete and/or steel, and observation wheel 22 can comprise steel and/or any of various other high-strength metallic alloys.

Figure 1:
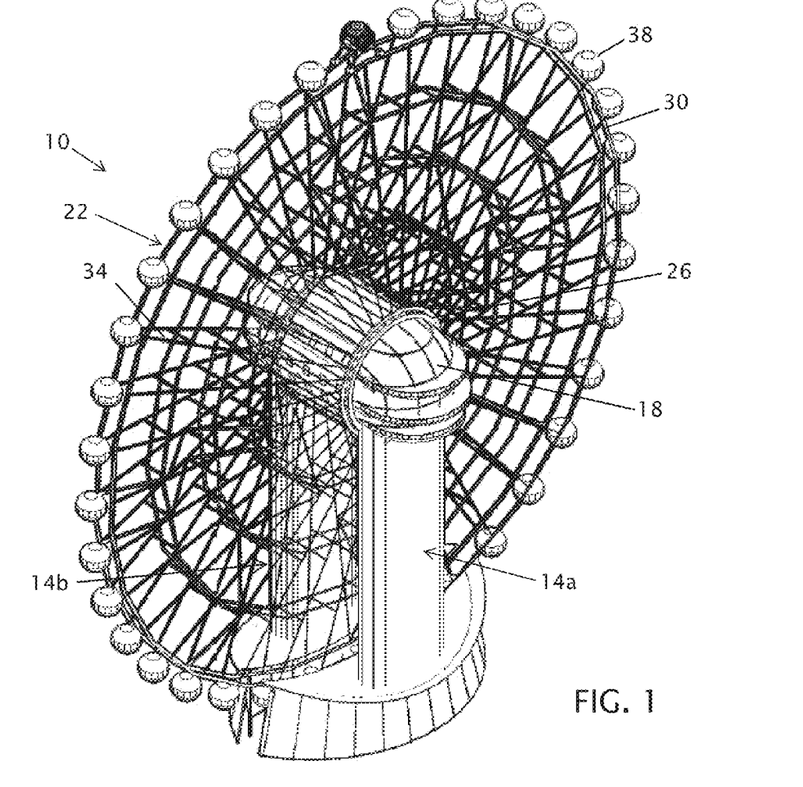
FIG. 1 is a perspective view of one of the present systems.
Figure 2:
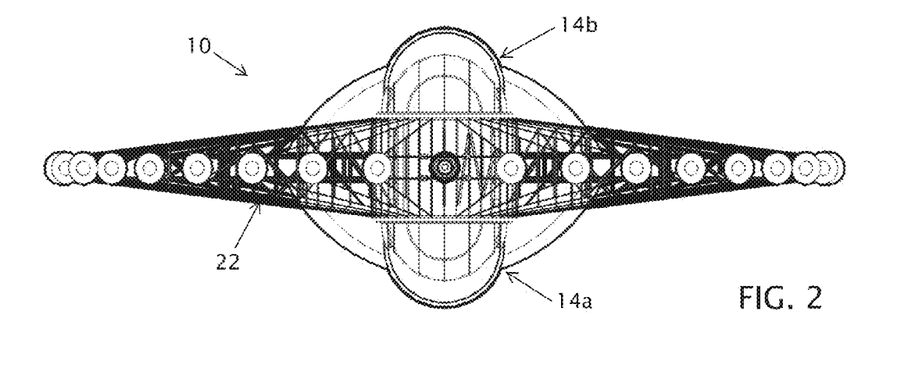
FIG. 2 is a top view of the system of FIG. 1.
Figure 3:
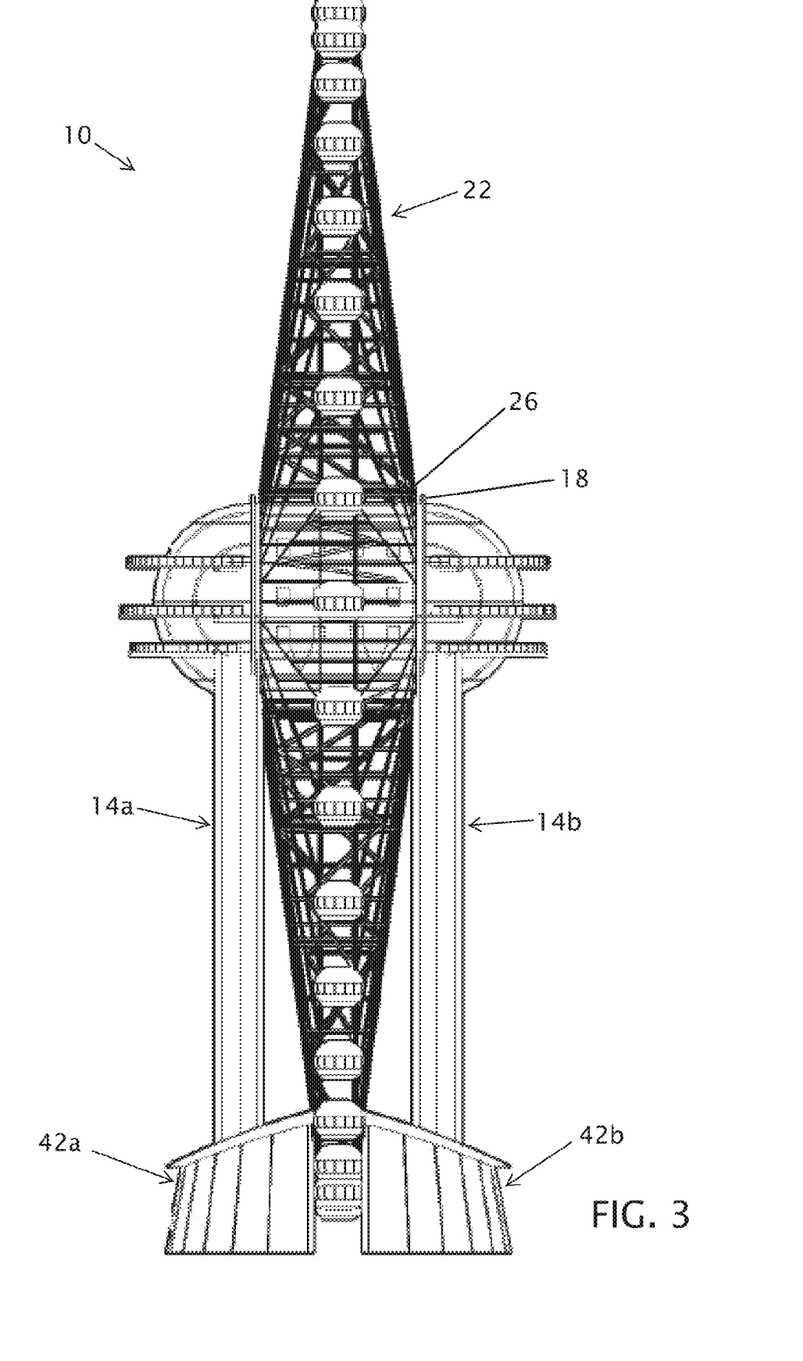
FIG. 3 is an front view of the system of FIG. 1.
Figure 4:
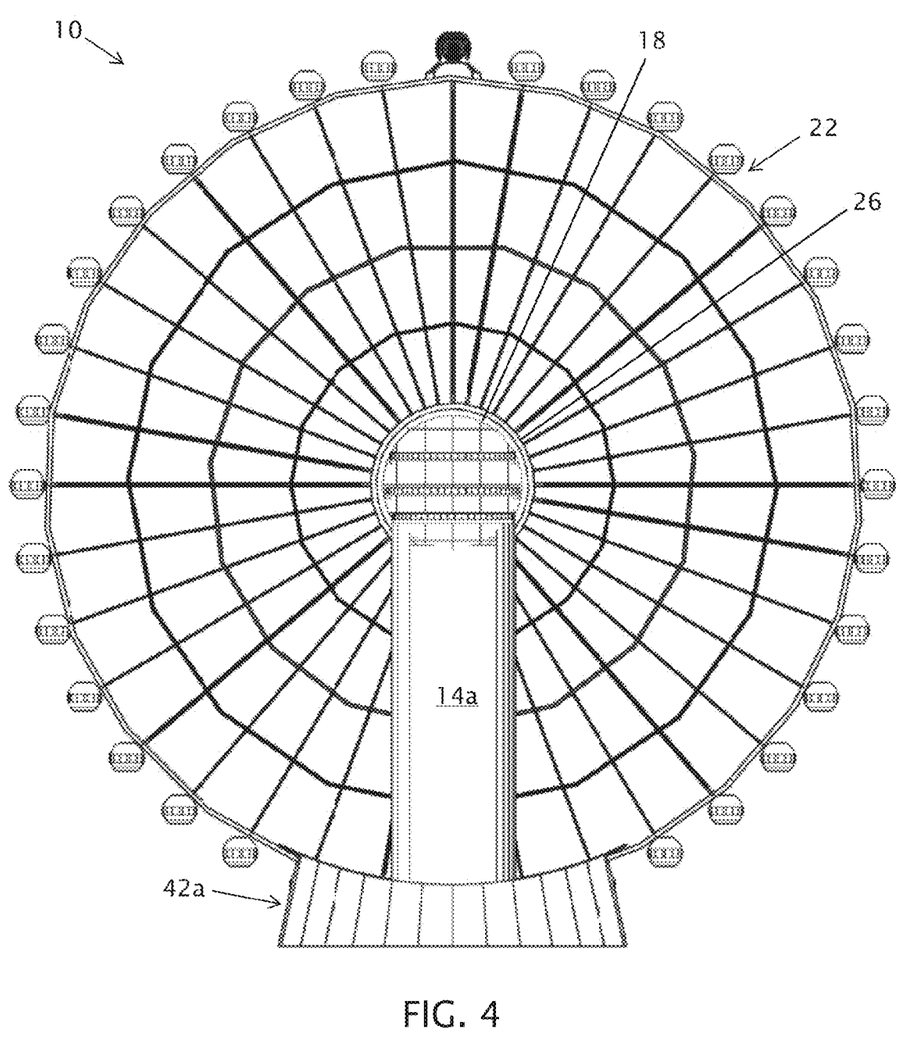
FIG. 4 is a side view of the system of FIG. 1.
Figure 5:
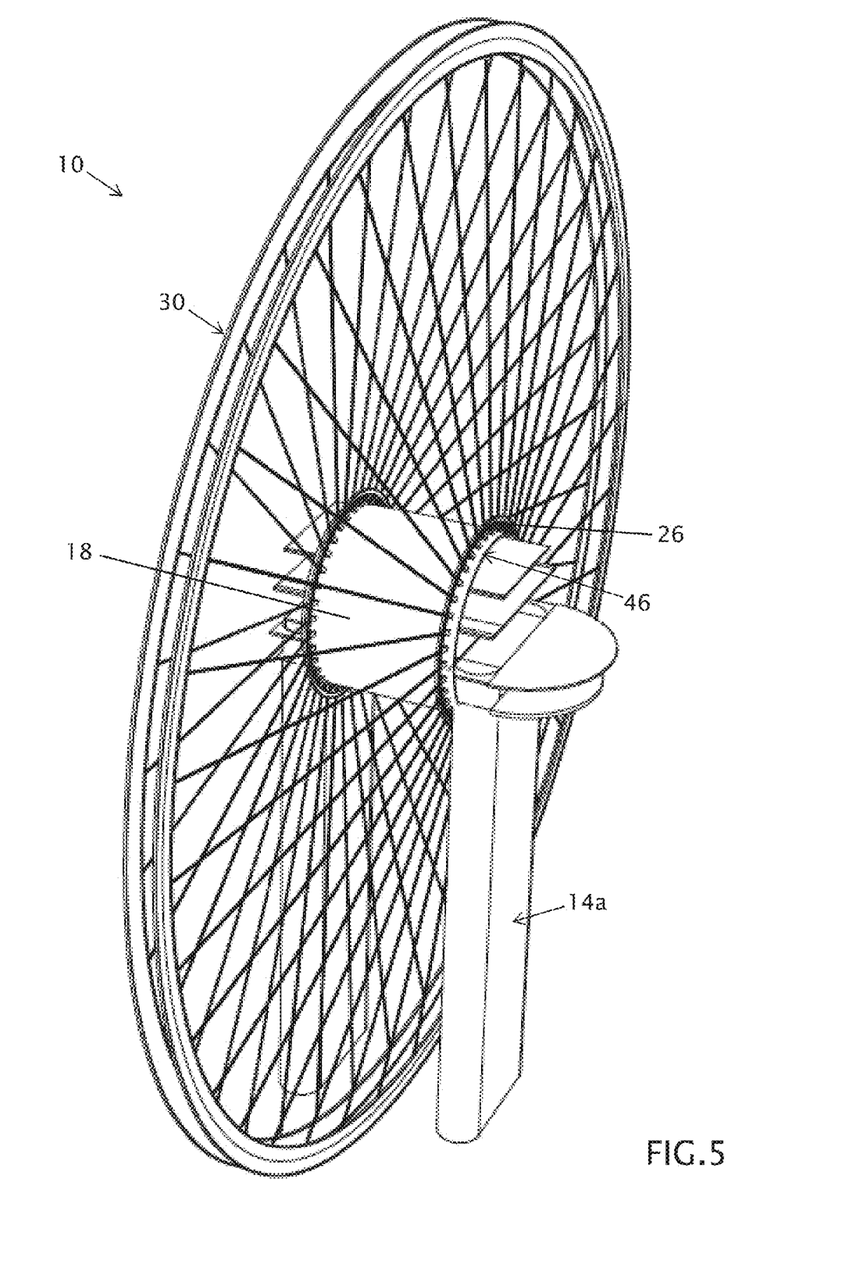
FIG. 5 is a perspective view of a portion of the system of FIG. 1.
Figure 6:
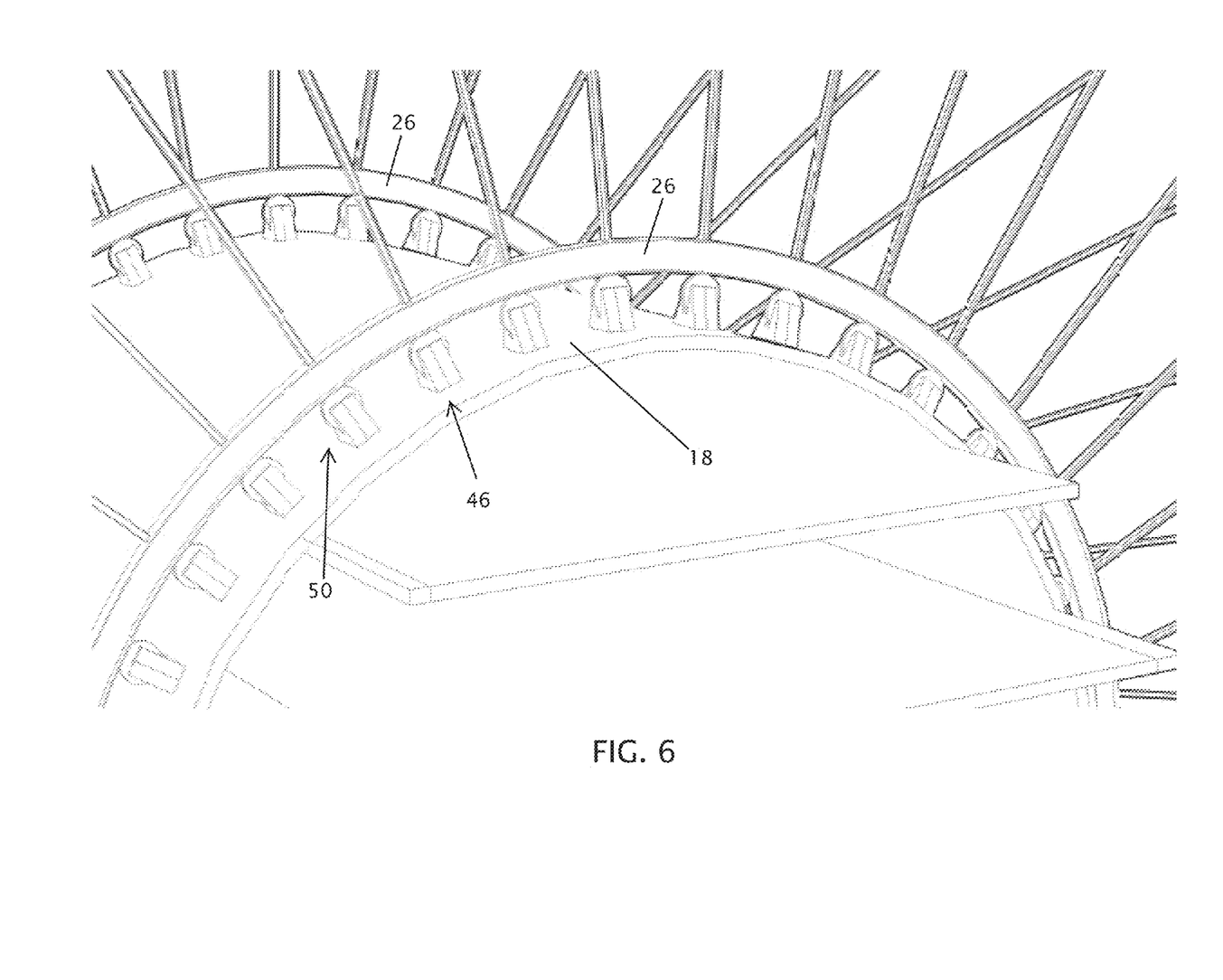
FIG. 6 is a fragmentary perspective view of a bearing subsystem of the system shown in FIG. 1.
Figure 7A:
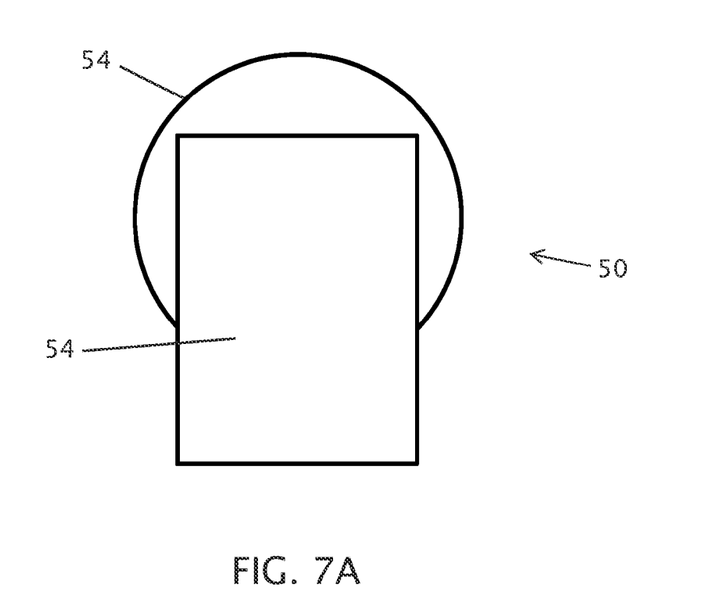
FIGS. 7A and 7B are side and front views, respectively, of a roller bearing assembly of the bearing subsystem shown in FIG. 6.
Figure 7B:
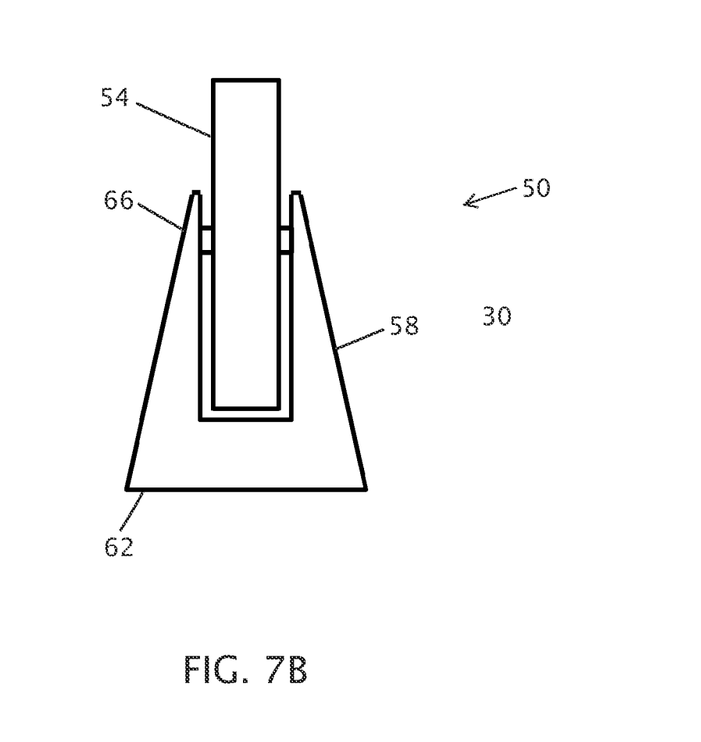

Referring now to FIGS. 5-7B; FIGS. 5 and 6 depict fragmentary views of system 10 showing tower hub 18, wheel hub 26, and a bearing subsystem 46 between the tower hub and the wheel hub in more detail; and FIGS. 7A-7B depict a bearing assembly 50 of the bearing subsystem. In this embodiment, bearing system 46 includes a plurality of roller bearings 54 disposed between tower hub 18 and wheel hub 26 to rotatably support observation wheel 22 relative to the tower (and tower hub 26), the roller bearings each having a transverse dimension (e.g. diameter) that is less than one quarter of the transverse dimension of the wheel hub. In the embodiment shown, each bearing assembly 50 includes a roller bearing 54 and a bearing mount 58. More particularly, in this embodiment, each bearing mount 58 has a first end 62 coupled in fixed relation to tower hub 18 and a second end 66 rotatably coupled to the roller bearing 54 (e.g., via an axle or pair of stub axles, as illustrated in FIG. 7B). In this embodiment, roller bearing 54 has a diameter of between 0.5 and 5 feet (e.g., 4 feet). In the embodiment shown, each bearing assembly 50 can be independently sealed. For example, where roller bearing 54 is coupled to bearing mount 58 by a single axle that extends through the roller bearing, grease can be disposed between the roller bearing and the axle and can be retained by seals coupled to the roller bearing on opposite sides of the roller bearing. As another example, where the roller bearing is coupled to the bearing mount by stub axles on either side of the roller bearing, grease can be disposed between the stub axles and the bearing mount and retained by seals coupled to the bearing mount on opposite sides of the roller bearing. In other embodiment, some or all of bearing mounts 58 may be affixed to the wheel hub. Roller bearings 54 and/or bearing mounts 58 can comprise, for example, steel and/or any of various other high-strength metallic alloys. Roller mounts 58 can also, in some embodiments, comprise concrete. Each individual roller bearing 54 may be covered with an elastomeric layer (or "spring pad"), which may be configured to function as an independent suspension for each roller bearing.

In some embodiments, an external diameter of the tower hub differs from an external diameter of the wheel hub by 4 feet or more. For example, in the embodiment shown, the inner diameter of wheel hub 26 is about 10 feet greater than the outer diameter of the portion of tower hub 18 around which wheel hub 26 is configured to rotate. In this example, the radial gap between the tower hub and the wheel hub at any given point is therefore 5 feet, such that the overall height of each bearing assembly 50 is 5 feet.

The present embodiments also offer additional benefits relative to conventional large-scale observation wheel attractions, which are typically limited in the external wind forces they can withstand during a storm or other wind event. The London Eye and subsequent wheels, such as the Singapore Flyer and the Star of Nanchang, for example, contain two, large, self-contained, sealed-axle rolling element bearings in the center hub of the wheel, which require a giant seal to encompass the bearing in order to exclude contamination and hold in lubricant. When utilizing large bearings in an observation wheel, the fact that high-grade metallurgical components can only be produced to a certain size while still maintaining quality becomes a constraint on the overall size of the attraction in high-wind cities. The present embodiments with a plurality of smaller, independently sealed bearing elements allow for the operation of extremely large pieces while negating the need for a large bearing and a large seal to encompass that bearing. For example, the embodiment of system 10 depicted in FIGS. 1-4, includes approximately 80 smaller, independently sealed bearing assemblies 50, reducing and/or eliminating many if not all of the size constraints typically associated with larger bearings. The relatively larger tower hub 18, in combination with the plurality of smaller bearings, makes construction of larger-scale observation wheels technically feasible by improving the manufacturability and durability of the bearing components, as well as improving the wind-loads that the system is able to ensure. For example, in system 10 the outer diameter of tower hub 18 of 80 feet aids in distributing high wind loads and results in a structurally beneficial ratio of the dimensions of the tower hub (and of the wheel hub) relative to the length of the spokes of the wheel.

Figure 8A:
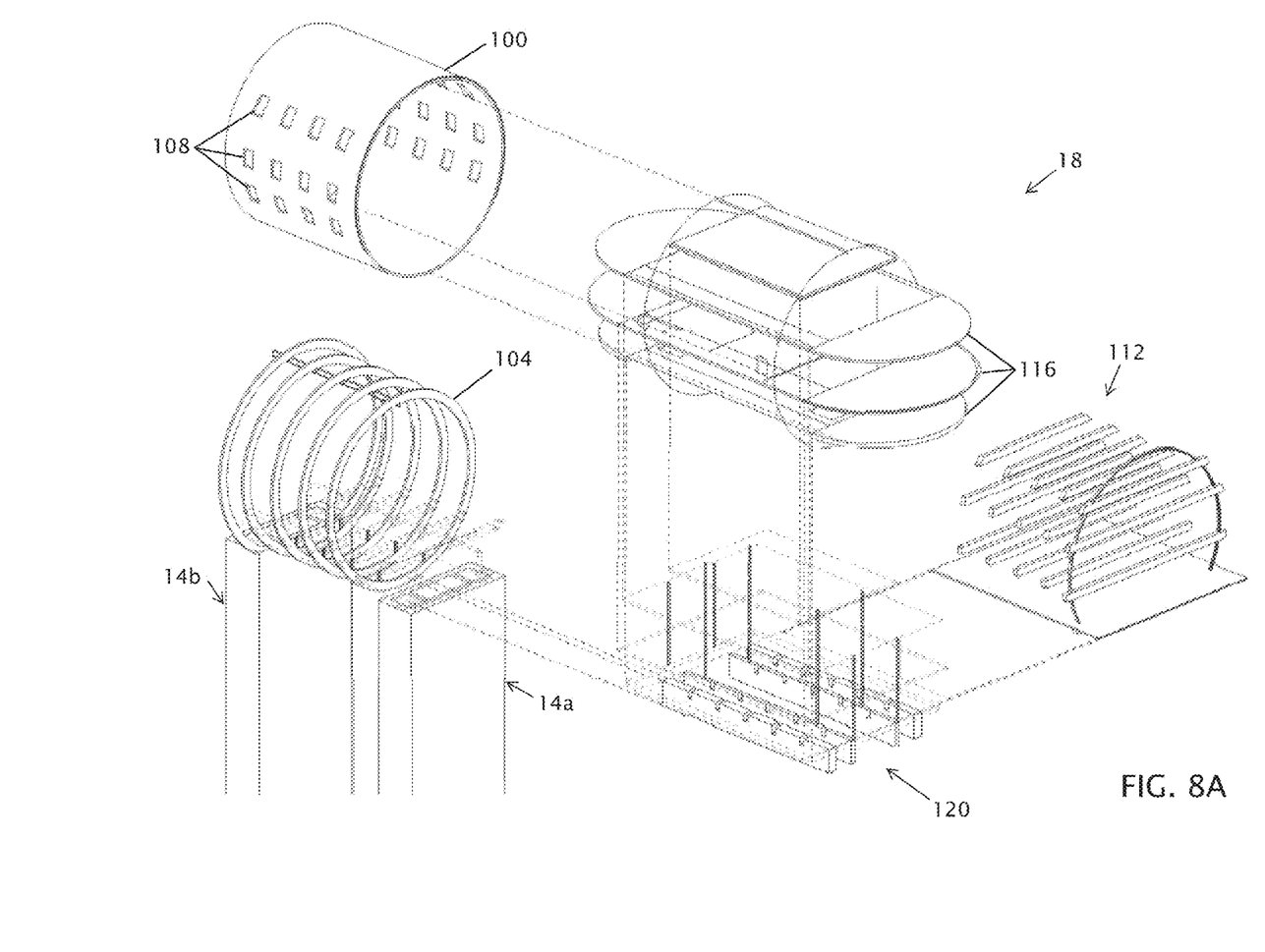
FIG. 8A is an exploded perspective view of part of a tower hub portion of the system of FIG. 1.
Figure 8B:
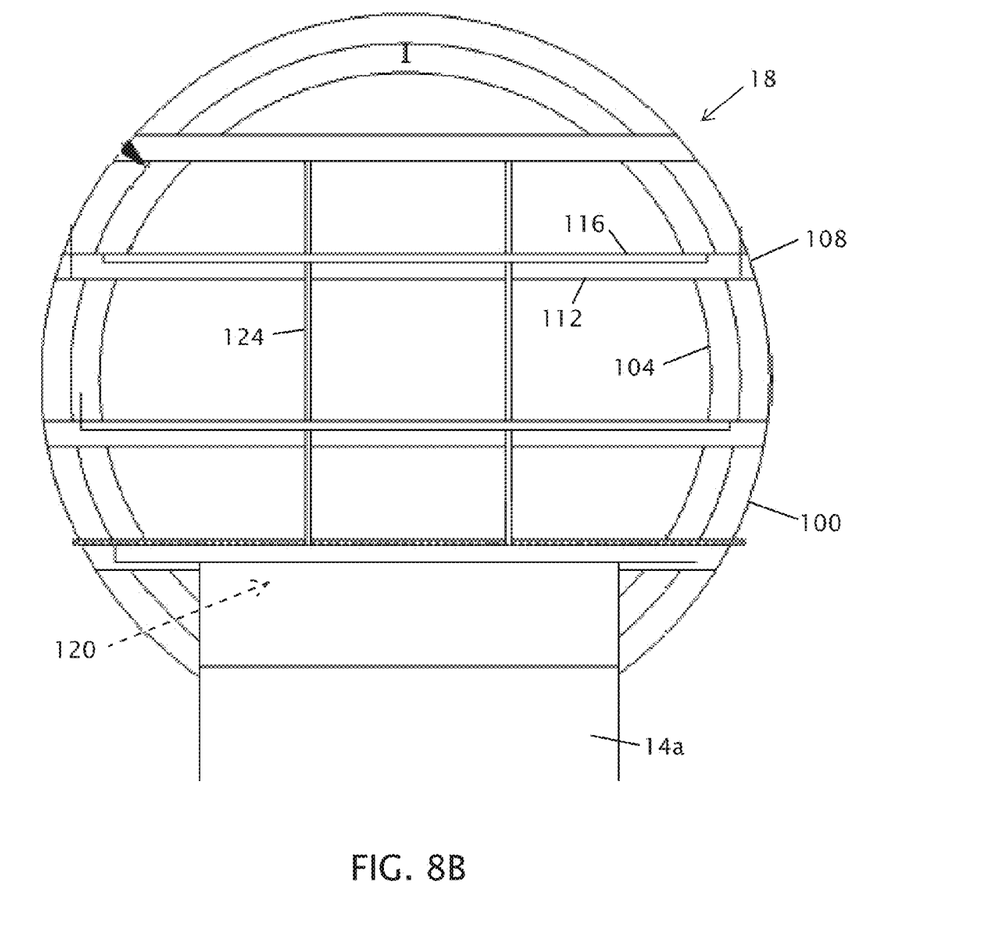
FIG. 8B is a side view of the part of the tower hub portion shown in FIG. 7A.

As illustrated in FIGS. 8A and 8B, in the depicted embodiment of system 10, the large-diameter (80 feet) of tower hub 18 also provides up to 20,000 square feet or more of unique event space within the tower hub—a feature not available due to the bearing design in conventional observation wheels. In this embodiment, tower hub 18 includes a cylindrical steel outer shell 100 supported by a plurality of circular steel girders 104 disposed within shell 100. In this embodiment, shell 100 includes a plurality of openings 108 through which beams 112 (e.g., steel and/or pre-stressed concrete beams) can extend to support (e.g., concrete) floors 116, as shown. In this embodiment, tower hub 18 further includes and is supported by beams 120 that extend between towers 14a and 14b, and through shell 100. A plurality of vertical columns 124 can further support the structural integrity of tower hub 18 which functions as an inner compression ring that is compressed by forces imparted on the roller bearings by the inner surfaces of wheel hub 26, which acts as an outer race beam. In some embodiments, the resulting space within the tower hub can include several levels of observation decks with interior and exterior space for visitors separated by glass windows. In other embodiments, shell 100 can comprise concrete.

Of course, system 10 also includes a robust (e.g., concrete) foundation (not shown), especially where installed in areas with high winds (e.g., Miami, where it would be subject to hurricane-force wind loads). The foundation may, for example, include drilled foundation piers extending below the ground surface. Towers 14a and 14b cooperate with the foundation to control and absorb high wind loads. These towers also provide access to the tower hub with stairways (e.g., extending up through the center of one or both towers) and/or elevators (e.g., extending up along a peripheral portion of the tower). The towers may, for example, be constructed or built by way of slip-formed concrete and can be configured, as shown, to provide a relatively narrow base (relative to the diameter of the observation wheel) which may be valuable in a congested city environment.

In some embodiments, a unique quadrant truss arrangement may be used in constructing and erecting observation wheel 22 that is more efficient than methods utilized on past observation wheel structures. In particular, spokes 34 can be erected and coupled to wheel hub 26 one spoke at a time with the respective spoke hanging down between the towers (14a and 14b) and then the spoke can be jacked or pulled up as the wheel hub is rotated a subsequent spoke is erected and coupled to the wheel hub, thereby reducing the need for full height cranes (e.g., cranes that are as tall as the full observation wheel.

In the embodiment shown, observation wheel 22 is configured to be operated (rotated) with a fraction wheel drive system, located between tower hub 18 and wheel hub 26 (e.g., in place of or between two hub assemblies 50). One or more motor-driven wheels (e.g., steel or urethane-covered wheels) can be coupled to a motor that is fixed to either of the tower hub or wheel hub and driven in contact the other of the tower hub or wheel hub. For example, it will generally be more efficient to fix the motor relative to the tower hub so the mass of the motor need not be driven along with the rest of the observation wheel. These driven wheels may, for example, be driven by electric motors coupled to gear reducers that drive a main gear attached to the wheel.

In some embodiments, system 10 also includes a secondary drive system (e.g., within one or both of bases 42a and 42b) that can apply rotational force to the observation wheel at the wheel's outer ring 30) using similar steel and/or urethane-covered fraction wheels driven by gear-head electric motors. Such a secondary drive system can also provide an emergence egress system for rotating observation wheel 22 to evacuate riders in case the primary drive system fails.

In some embodiments, system 10 can include a plurality of solar cells disposed on towers 14a and 14b, bases 42a and 42b, and/or observation wheel 22. In some embodiments, such solar cells (and corresponding storage batteries, if included) can provide a majority (if not all) of the energy needed to rotate the observation wheel (e.g., at least during times of balanced or substantially steady-state operation—at which the rolling friction is relatively minimal due to improved bearing system 46).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:
1. A system comprising:
a tower;
a tower hub coupled to the tower and having a transverse dimension of at least 50 feet;
an observation wheel rotatably coupled to the tower and having a central wheel hub;
a plurality of roller bearings disposed between the tower hub and the wheel hub to rotatably support the observation wheel relative to the structure, the roller bearings each having a diameter that is less than one quarter of the transverse dimension of the wheel hub.

2. The system of claim 1, where the tower includes a base and a height of at least 200 feet above a ground level at the base, and the observation wheel having a transverse dimension of at least 400 feet.

3. The system of claim 2, where the tower is a first tower, the system further comprising:
   a second tower spaced apart from the first tower and coupled to the tower hub;
   where the tower hub extends between the first and second towers.

4. The system of claim 1, further comprising:
   a plurality of bearing mounts each coupled to a different one of the roller bearings.

5. The system of claim 4, where the plurality of bearing mounts each has a first end coupled in fixed relation to the tower hub and a second end rotatably coupled to the respective roller bearing.

6. The system of claim 5, where the wheel hub has a first diameter, the tower hub has a second diameter that is smaller than the first diameter, and the wheel hub is configured to rotate around the tower hub.

7. The system of claim 1, where each of the plurality of roller bearings has a diameter of between 0.5 and 5 feet.

8. The system of claim 7, where the diameter of the tower hub differs from the diameter of the wheel hub by 4 feet or more.

9. The system of claim 8, where the diameter of the tower hub is greater than 70 feet.

10. The system of claim 1, where each of the plurality of roller bearings is independently sealed.

11. A method comprising:
    disposing a plurality of bearings between a tower hub and an observation wheel rotatably coupled to the tower, the tower hub coupled to a tower and having a transverse dimension of at least 50 feet, and the observation wheel having a central wheel hub;
    where the roller bearings are disposed between the tower hub and the wheel hub to rotatably support the observation wheel relative to the structure, the roller bearings each having a diameter that is less than one quarter of the transverse dimension of the wheel hub.

12. The method of claim 11, where the tower includes a base and a height of at least 200 feet above a ground level at the base, and the observation wheel having a transverse dimension of at least 400 feet.

13. The method of claim 12, where the tower is a first tower, a second tower is spaced apart from the first tower and coupled to the tower hub, and the tower hub extends between the first and second towers.

14. The method of claim 11, where a plurality of bearing mounts are each coupled to a different one of the roller bearings.

15. The method of claim 14, where the plurality of bearing mounts each has a first end and a second end rotatably coupled to the respective roller bearing, and disposing the roller bearings comprises coupling the first end of each roller bearing in fixed relation to the tower hub.

16. The method of claim 15, where the wheel hub has a first diameter, the tower hub has a second diameter that is smaller than the first diameter, and the wheel hub is configured to rotate around the tower hub.

17. The method of claim 11, where each of the plurality of bearing elements has a diameter of between 0.5 and 5 feet.

18. The method of claim 17, where the diameter of the tower hub differs from the diameter of the wheel hub by 4 feet or more.

19. The method of claim 18, where the diameter of the tower hub is greater than 70 feet.

20. The method of claim 11, where each of the plurality of roller bearings is independently sealed.

* * * * *